(12) United States Patent
McCay

(10) Patent No.: US 7,080,718 B2
(45) Date of Patent: Jul. 25, 2006

(54) PARKED CAMPER STABILIZER

(75) Inventor: Kenneth L. McCay, 470 Tabernacle Rd., Locust Fork, AL (US) 35097

(73) Assignee: Kenneth L. McCay, Locust Fork, AL (US)

( * ) Notice: Subject to any disclaimer, the term of this patent is extended or adjusted under 35 U.S.C. 154(b) by 0 days.

(21) Appl. No.: 10/842,504

(22) Filed: May 11, 2004

(65) Prior Publication Data
US 2005/0252729 A1 Nov. 17, 2005

(51) Int. Cl.
B60T 1/00 (2006.01)

(52) U.S. Cl. .................. 188/28; 188/265; 410/100; 410/12

(58) Field of Classification Search .................. 188/42, 188/4 B, 28, 265; 410/96, 100, 20, 10, 12, 410/21, 9, 19, 30, 100 X, 12 X
See application file for complete search history.

(56) References Cited

U.S. PATENT DOCUMENTS

| | | | | | |
|---|---|---|---|---|---|
| 4,155,537 | A | * | 5/1979 | Bronson et al. | 242/388.3 |
| 4,611,961 | A | * | 9/1986 | Van Iperen et al. | 410/20 |
| 5,584,622 | A | * | 12/1996 | Dickerson, Sr. | 410/21 |
| 5,608,951 | A | * | 3/1997 | Chou | 24/302 |
| 5,941,665 | A | * | 8/1999 | Dahlin | 410/20 |
| 6,139,231 | A | * | 10/2000 | Kissel | 410/20 |
| 6,328,511 | B1 | * | 12/2001 | Cardona | 410/12 |
| 6,705,811 | B1 | * | 3/2004 | Selby | 410/3 |
| D494,919 | S | * | 8/2004 | Davis et al. | D12/223 |
| 2004/0253072 | A1 | * | 12/2004 | Lockhart et al. | 410/97 |

OTHER PUBLICATIONS

STIC search report.*

* cited by examiner

Primary Examiner—Devon Kramer

(57) ABSTRACT

A parked camper stabilizer comprises a tensioning mechanism, a fixed wheel engagement member fixed to the tensioning mechanism, and an adjustable wheel engagement member adjustably attached to the tensioning mechanism. The fixed wheel engagement member includes two or more straps, each with a hook for attaching to a trailer wheel. The adjustable wheel engagement member includes one or more straps, each with a hook for attaching to a trailer wheel.

1 Claim, 3 Drawing Sheets

PARKED CAMPER STABILIZER

BACKGROUND OF THE INVENTION

Recreational vehicle use has been increasing steadily in the U.S. for many years. Early travel trailers offered few amenities for travelers. To remedy this, bigger and heavier trailers were produced to provide more of the comforts of home. Taking advantage of this, more people spent more time travelling or simply living in their trailers. Manufacturers have responded to their demands for ever more comfortable trailers, further increasing the size and weight of the trailers. It is now unusual for a travel trailer to have only one axle, and more common to have two or more axles.

As homes, travel trailers are a series of compromises. Every aspect of a trailer must fit within the dimensions of existing roadways and comply with Department of Transportation regulations and guidelines. One basic difference between a house and a recreational vehicle trailer is the wheel and suspension system.

The trailer's suspension is designed to adapt and react to irregularities in the road surface. This permits the trailer body to remain relatively motionless in the vertical plane with respect to the road surface. This protects the trailer body from excessive shock, impact damage and vibration. However, those very qualities that serve to protect the trailer also permit the trailer to rock, roll and exhibit excessive motion when parked, due to the motion of trailer occupants.

Numerous devices have been designed to reduce the amount of motion experience by stationary trailers, including wheel chocks, wedge mechanisms, and frame jacks. Each of these concepts has its own set of disadvantages.

Wheel chocks are designed to bear tightly against the trailer's tires where they meet the ground. Optimally, the chocks should be used in pairs to prevent the trailer from rolling in either direction. However, while chocks are very good at preventing a trailer from rolling away, they are not able to eliminate much wheel rolling motion. On level ground, no matter how tightly one chock bears against a tire, the amount of control or stability is reduced by the amount of force applied by the other chock. It is virtually impossible to place both chocks in position tightly at the same time, due to tire pressure and external forces. Chocks permit a significant amount of motion. In addition, chocks are bulky and can be quite heavy due to their strength requirements.

Wedge mechanisms are designed to act as vertically-oriented chocks that are connected together and are used with tandem-axle trailers. A top wedge bridges the gap between the two tires above the tires' centerline. A lower wedge is symmetrically oriented below the centerline of the tires. Each wedge is too broad to fit between the tires at the narrowest point. Thus, when the wedges are linked to each other, drawing them closer together acts to frictionally jam the tires in place. However, trailer tires are very flexible in their tread, by necessity. Thus, the frictional interference between the tires and wedges will not prevent the tire tread from flexing due to the motion of a trailer occupant. Further, the strength and dimensional requirements of the wedges and accompanying tensioning mechanism means that this system is bulky and heavy.

Frame jacks are another option. The jacks are positioned between the ground and the trailer's frame to slightly lift the trailer and decrease or eliminate the role of the wheels and suspension while the trailer is parked. Jacks are very effective in reducing the vertical motion of a trailer, but they must be extended carefully to prevent excessive trailer frame twist. Further, jacks require a solid surface or very firm soil condition to prevent their sinking into the ground. This often requires a ready supply of heavy timbers or other lumber to distribute the load from the jack, or to allow a short jack to reach the trailer frame. This is also a heavy, bulky solution. Thus, what is needed is an effective solution to eliminate undesirable motion in stationary trailers that is lightweight and easy to store.

SUMMARY

The device is a parked camper stabilizer that comprises a tensioning mechanism, a fixed wheel engagement member fixed to the tensioning mechanism, and an adjustable wheel engagement member adjustably attached to the tensioning mechanism. In the preferred embodiment, the tensioning mechanism is a ratchet. Both the fixed and adjustable wheel engagement mechanisms are comprised of a high-strength strap or multiple straps. A hook is attached at the end of each strap to connect to the wheels on a tandem axle trailer. Attaching the straps and hooks across the trailer's wheels and tensioning the assembly acts to limit and restrict rotational wheel movement while the trailer is parked and occupied, increasing occupant comfort.

An advantage of the present invention is the provision of a method and apparatus for an effective, lightweight, parked camper stabilizer.

Another advantage of the present invention is the provision of a method and apparatus for reducing excess motion of stationary tandem-axle trailers.

Another advantage of the present invention is the provision of a method and apparatus for a tandem-axle trailer stabilizer that is easily stowed.

Another advantage of the present invention is the provision of a method and apparatus for a tandem-axle trailer stabilizer that eliminates bulky and expensive chocks, wedges and jacks.

Another advantage of the present invention is the provision of a method and apparatus for a tandem-axle trailer stabilizer that is simple to adjust, install and maintain.

BRIEF DESCRIPTION OF THE DRAWINGS

The foregoing and other and further objects, features, and advantages of the Invention will be indicated in the appended claims or will be apparent upon an understanding of the following more particular description of the preferred embodiments as illustrated in the accompanying drawings in which a reference character refers to the same part throughout the various views as set forth in the two (2) Indices immediately following the list of figures immediately below. The drawings are not necessarily to scale, emphasis instead being placed upon illustrating the principles of the Invention. Moreover, various objects, features, and advantages of the Invention not referred to herein will occur to one skilled in the art upon employment of the Invention in practice.

Figure 1:
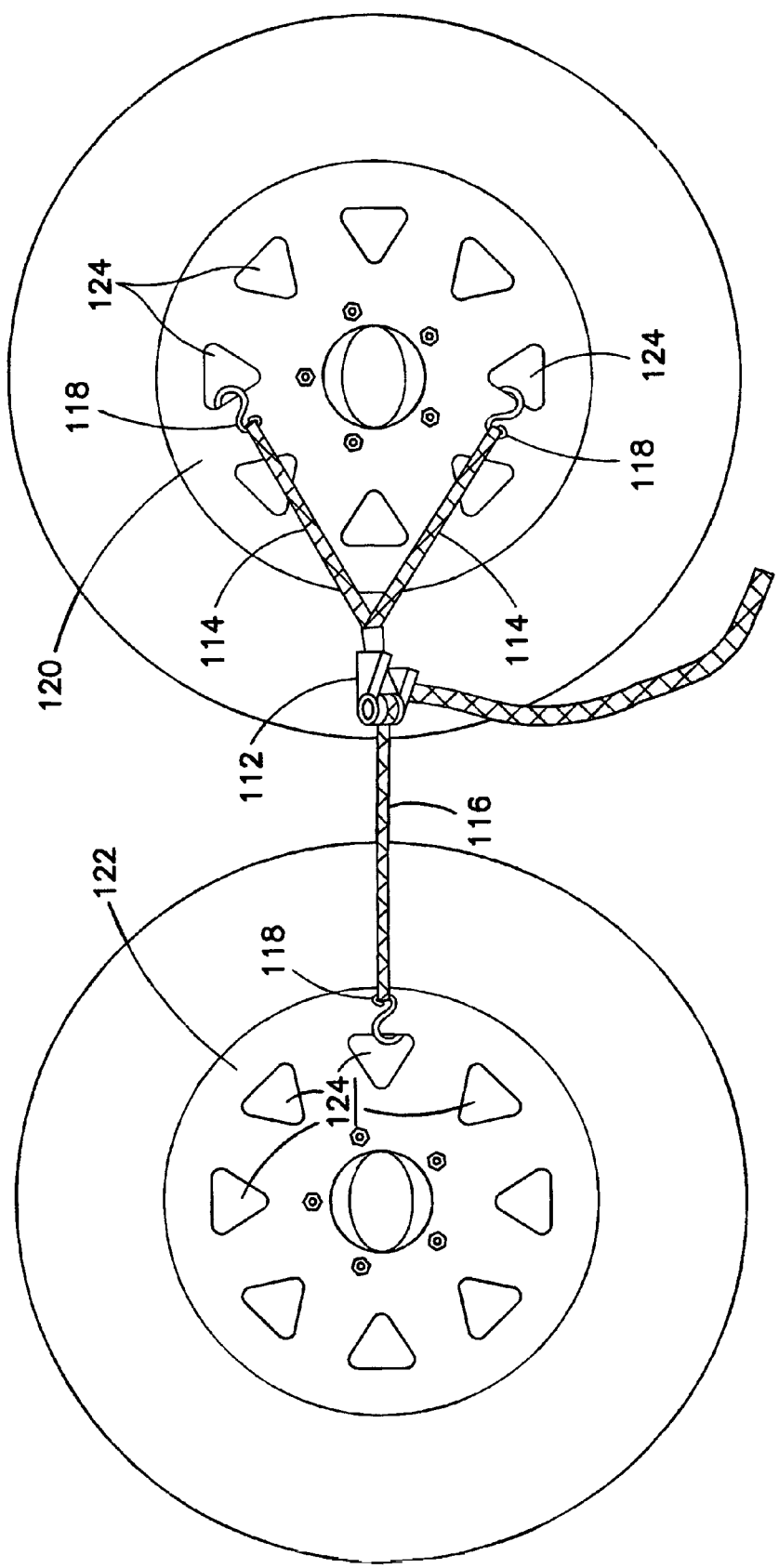
FIG. 1 is a side elevation view of the tandem-axle trailer stabilizer mounted to a trailer in accordance with one embodiment of the invention.

An Index of Reference Characters as well as an Index of Part Names follow:

BRIEF DESCRIPTION OF THE DRAWINGS INDEX

Reference Characters 110 tandem-axle trailer stabilizer
112 ratchet mechanism
114 fixed wheel straps
116 adjustable wheel strap
118 wheel hooks
120 rear trailer wheel
122 front trailer wheel
124 wheel spoke holes

BRIEF DESCRIPTION OF THE DRAWINGS INDEX

Index of Part Names 124 holes, wheel spoke
118 hooks, wheel
112 ratchet mechanism
110 stabilizer, tandem-axle trailer
116 strap, adjustable wheel
114 straps, fixed wheel
122 wheel, front trailer
120 wheel, rear trailer

DETAILED DESCRIPTION OF THE DRAWINGS

Figure 2:
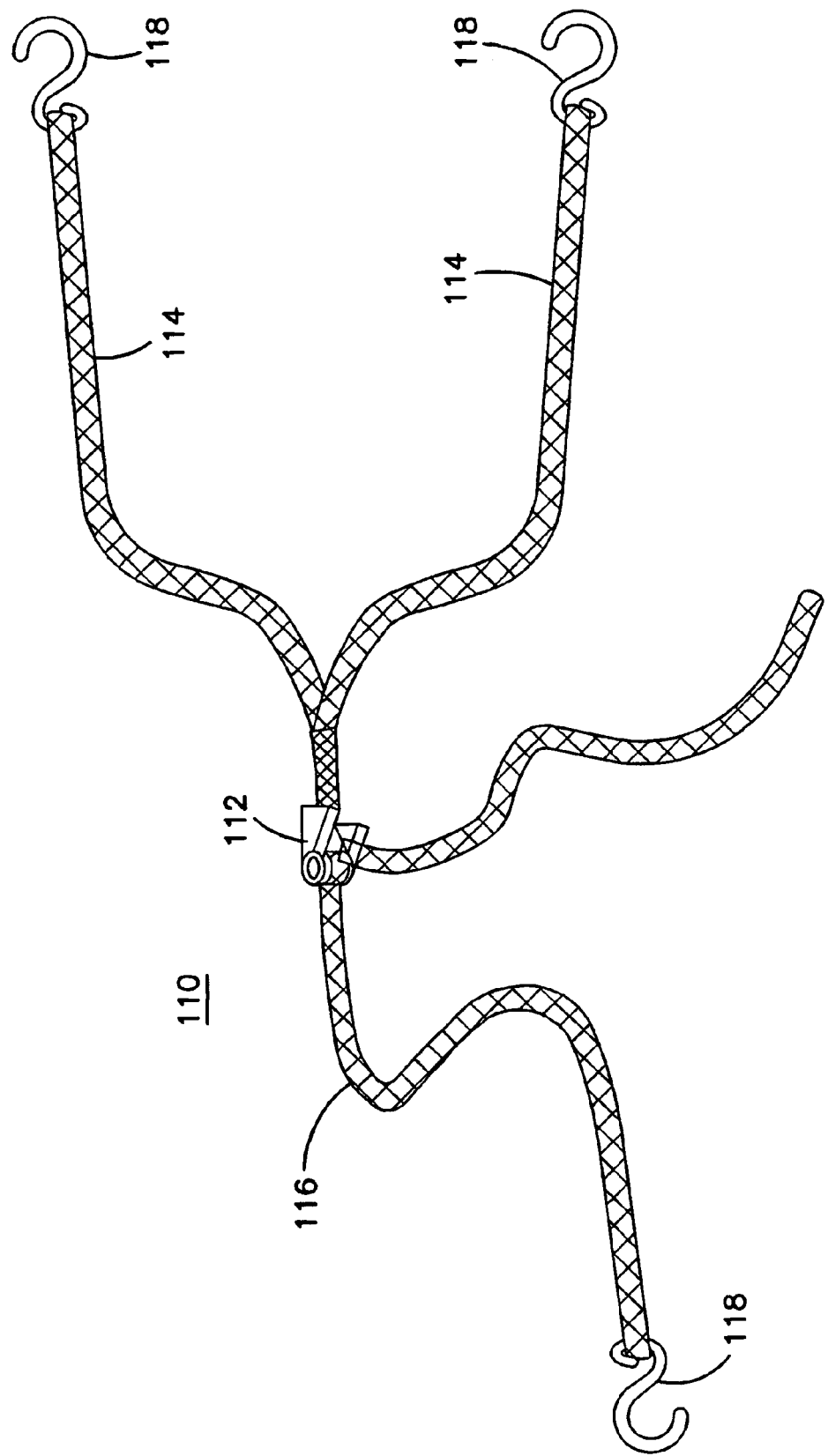
FIG. 2 is an isometric view of the tandem-axle trailer stabilizer in accordance with one embodiment of the invention.

FIGS. 1 and 2 shows a tandem-axle trailer stabilizer 110 comprising a tensioning mechanism, a fixed wheel engagement member attached to the tensioning mechanism, and an adjustable wheel engagement member attached to the tensioning mechanism. In the preferred embodiment, the tensioning mechanism is a ratchet 112.

The fixed wheel engagement member is preferably two flexible straps 114 wherein each fixed wheel strap 114 has a first end and a second end. The first ends of the fixed wheel straps 114 are permanently fixed to the tensioning mechanism 112, and the second ends of the fixed wheel straps 114 are fixed to separate wheel hooks 118 or other devices suitable for temporary attachment to a rear wheel 120 of a pair of tandem trailer wheels 120, 122.

The adjustable wheel engagement member is preferably one or more flexible straps wherein each adjustable wheel strap 116 has a first end and a second end. The first end of the adjustable wheel strap 116 is adjustably attached to the tensioning mechanism 112, and the second end of the adjustable wheel strap 116 is fixed to a wheel hook 118 or other device suitable for temporary attachment to a front wheel 122 of a pair of tandem trailer wheels 120, 122.

In use, the wheel hooks 118 of the fixed wheel engagement member are attached to the rear wheel 120, with one hook 118 toward the top of the rear wheel 120 and the other hook 118 toward the bottom of the rear wheel 120. The greater the distance between the hooks 118 on the fixed wheel engagement member, the greater the control of wheel motion by the tandem axle trailer stabilizer 110. Next, the wheel hook 118 of the adjustable wheel engagement member is attached to the front wheel 122. The position of the wheel hook 118 upon the front wheel 122 may be adjusted to provide uniform tension through the fixed wheel straps 114 when the ratchet tensioning mechanism 112 is tightened. Thus tensioned, the trailer wheels 120, 122 will exhibit minimal rock and roll, maximizing trailer stability and control. Maximum trailer control depends on trailer load, terrain contour, tire pressure and other factors. Preferably, the wheel hooks 118 are attached to the trailer wheels 120, 122 via spoke holes 124 or other suitable orifices in the wheels 120, 122. The wheel hooks 118 may be coated with plastic or rubber to prevent the wheel hooks 118 from marring the wheels.

Where the adjustable wheel engagement member comprises two flexible straps, the hooks 118 are attached to the front wheel 122 of the pair of tandem trailer wheels in the same manner as the wheel hooks 118 of the fixed wheel engagement members are attached to the rear wheel 120. The adjustable wheel strap 116 is adjusted to remove excess strap length to permit proper operation of the ratchet mechanism 112. As tension is applied through the fixed and adjustable wheel straps 114, 116 and wheel hooks 118, the pair of tandem trailer wheels 120, 122 is mechanically prevented from twisting or rolling about their axes, reducing the motion of the trailer and increasing occupant comfort.

Removal of the tandem axle trailer stabilizer 110 requires the user to release the tension from the ratchet mechanism 112 and to disengage the fixed and adjustable wheel straps 114, 116 and wheel hooks 118 from the tandem-axle trailer wheels 120, 122. The user may attach the fixed wheel straps 114 and wheel hooks 118 to the front wheel 122, and the adjustable wheel strap 116 and wheel hook 118 to the rear wheel 120 as necessary without affecting the function of the tandem axle trailer stabilizer 110.

Figure 3:
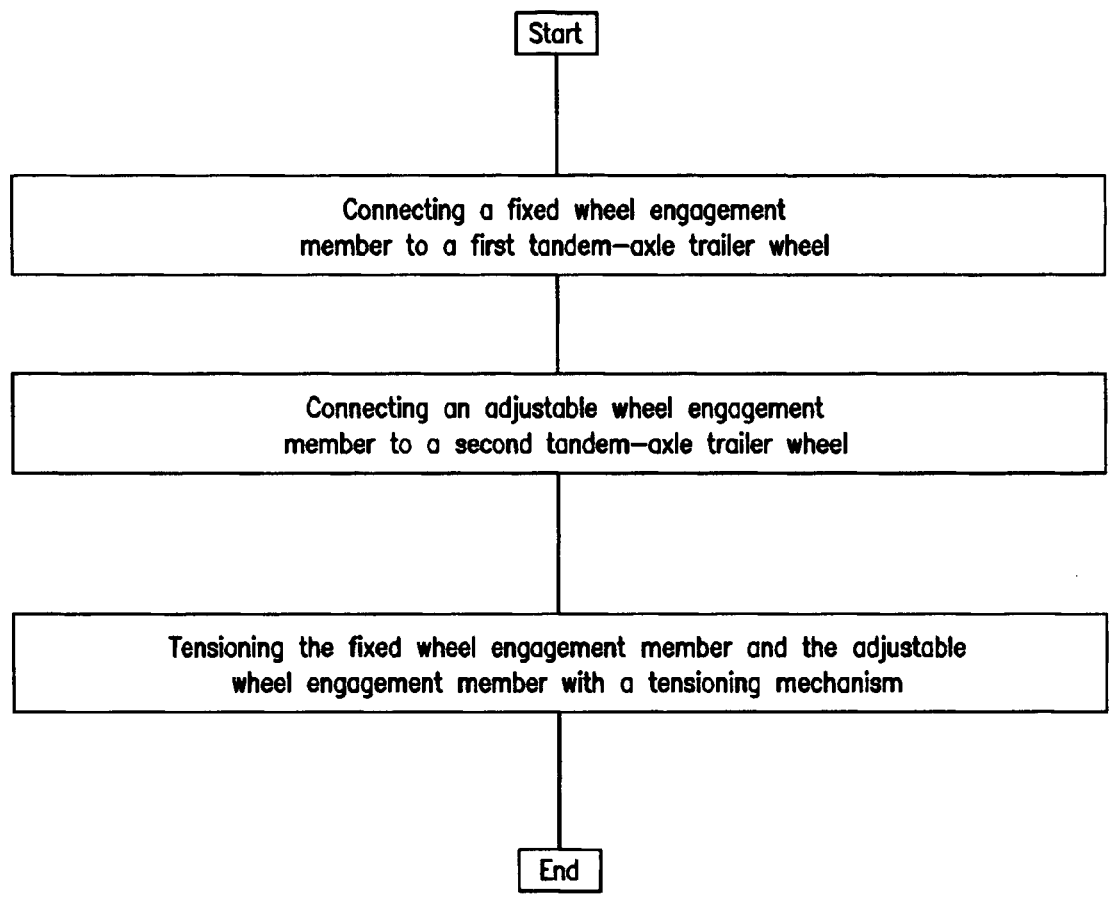
FIG. 3 is a flow chart for employing the tandem-axle trailer stabilizer in accordance with one embodiment of the invention.

FIG. 3 is a flow chart of the steps used in a method to reduce excess motion of a parked tandem-axle travel trailer in accordance with the preferred embodiment of the invention. The process starts, step 200, by connecting a fixed wheel engagement member to a first tandem-axle trailer wheel, step 202. The user connects an adjustable wheel engagement member to a second tandem-axle trailer wheel, step 204. At step 206, the user tensions the fixed wheel engagement member and the adjustable wheel engagement member with a tensioning mechanism, ending the process, step 208.

In one embodiment, the user connects a plurality of wheel hooks of the fixed wheel engagement member to the first tandem-axle trailer wheel. The one or more wheel hooks of the adjustable wheel engagement member are connected to the second tandem-axle trailer wheel. The user draws excess length of the adjustable wheel engagement member through the tensioning mechanism before tensioning the tandem axle trailer stabilizer with the tensioning mechanism.

I claim:

1. A method of operating a parked camper stabilizer comprising the following steps:
   (a) connecting a fixed wheel engagement member to a first tandem-axle trailer wheel;
   (b) connecting a plurality of wheel hooks of the fixed wheel engagement member to the first tandem-axle trailer wheel;
   (c) connecting an adjustable wheel engagement member to a second tandem-axle trailer wheel;
   (d) connecting one or more wheel hooks of the adjustable wheel engagement member to the second tandem-axle trailer wheel;
   (e) drawing excess length of the adjustable wheel engagement member through a tensioning mechanism; and
   (f) tensioning the fixed wheel engagement member and the adjustable wheel engagement member with the tensioning mechanism.

* * * * *